United States Patent
Huang

(10) Patent No.: US 8,873,402 B2
(45) Date of Patent: Oct. 28, 2014

(54) SERVICE MONITORING AND SERVICE PROBLEM DIAGNOSING IN COMMUNICATIONS NETWORK

(75) Inventor: Yangcheng Huang, Athlone (IE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 205 days.

(21) Appl. No.: 13/387,771

(22) PCT Filed: Jul. 31, 2009

(86) PCT No.: PCT/EP2009/059979
§ 371 (c)(1),
(2), (4) Date: Apr. 12, 2012

(87) PCT Pub. No.: WO2011/012173
PCT Pub. Date: Feb. 3, 2011

(65) Prior Publication Data
US 2012/0188879 A1    Jul. 26, 2012

(51) Int. Cl.
*H04L 1/00*  (2006.01)
*H04L 12/24*  (2006.01)

(52) U.S. Cl.
CPC ........ *H04L 41/5067* (2013.01); *H04L 41/5035* (2013.01); *H04L 41/5074* (2013.01)
USPC ...................................................... 370/242

(58) Field of Classification Search
CPC ........... H04J 3/14; H04L 43/50; H04L 43/00; H04L 1/00; H04B 10/0771
USPC ...................................................... 370/242
See application file for complete search history.

(56) References Cited

U.S. PATENT DOCUMENTS

| 7,603,372 B1 * | 10/2009 | Honicky et al. ................. 1/1 |
| 2002/0111755 A1 | 8/2002 | Valadarsky et al. |
| 2006/0233313 A1 | 10/2006 | Adams et al. |
| 2007/0201621 A1 | 8/2007 | Ethier et al. |

OTHER PUBLICATIONS

3GPP (TS 32.422 v8.5.0 2009-06) "3rd Generation Partnership Project; Technical Specification Group Services and System Aspects; Telecommunication management; Subscriber and equipment trace; Trace control and configuration management (Release 8)" submitted as prior art by the applicant.*
PCT International Search Report, dated Dec. 16, 2009, in connection with International Application No. PCT/EP2009/059979.

(Continued)

*Primary Examiner* — Andrew Lai
*Assistant Examiner* — Jamaal Henson
(74) *Attorney, Agent, or Firm* — Leffler Intellectual Property Law, PLLC

(57) ABSTRACT

User equipment uses traces of service primitives of one or multiple service sessions to automatically discover a service sequence. Service sequences are refined by analyzing sequences captured during multiple sessions of the same service. A daemon receives from a plurality of user equipment the observed service sequences. The sequences from different user equipment are aggregated. The daemon sends back the refined service sequences to user equipment. User equipment sends a problem report to the daemon and/or a service monitor in the case of a service failure. The daemon or the service monitor aggregates such problem reports and discovers the causes of service degradations.

17 Claims, 6 Drawing Sheets

(56) References Cited

OTHER PUBLICATIONS

3GPP Technical Specification 32.422, V8.5.0 Telecommunication management; Subscriber and equipment trace; Trace control and configuration management (Release 8), 3GPP, 650 Route des Lucioles, Sophia Antipolis, Valbonne, France, Jun. 2009, XP002550358. Retrieved from the Internet: URL: http://www.3gpp.org.

3GPP Technical Specification 32.421, V8.5.0 Telecommunication management; Subscriber and equipment trace; Trace concepts and requirements (Release 8), 3GPP, 650 Route des Lucioles, Sophia Antipolis, Valbonne, France, Jun. 2009, XP002550359. Retrieved from the Internet: URL: http://www.3gpp.org.

* cited by examiner

SERVICE MONITORING AND SERVICE PROBLEM DIAGNOSING IN COMMUNICATIONS NETWORK

TECHNICAL FIELD

The present invention relates to multimedia services provided in a communications network, in general, and in particular to fault reporting and diagnosis in a communications network.

BACKGROUND

With the advent of high speed internet access whether via wireline or wireless connection accessing television or other multimedia services become reality. However, distributing TV in an IP (Internet Protocol) network is a challenging task. TV viewers expect nothing but the highest quality, while the IPTV (Internet Protocol TV) service itself puts higher requirements on the IP network than other services. The ability to act quickly and decisively in addressing any problems in the IPTV delivery chain from a head end to a subscriber is absolutely the key to success.

However, diagnosis of IP TV service is a non-trivial problem. The modern telecommunication network is a large-scale distributed system composed of complex inter-operating sub-networks. Each service deployment involves a number of heterogeneous network entities (servers, routers, switches) with different functionalities (authentication, resource control, etc). Any entity in the network may be faulty, e.g. out of order or of poor performance. The large amount of entities and the complicated (direct or indirect) dependencies in many cases bury the faulty entities. This is demonstrated in FIG. 1, which shows example of user steps in video-on-demand shop TV service. It is not important for understanding of the present invention that is to be described what are the individual steps, what is important is that if any of the steps leading to the service goes wrong, the service would fail.

On the other hand, current network and service monitoring tools provides little reliable indication of where the problem lies. Thus, when a service like IPTV goes down, it may take the service providers considerable amount of time before the cause of the problem is found.

There are known systems that can detect service quality degradation like servicEye or Agama IPTV Quality Assurance. This is, however not enough because the service provider needs to know the causes of the degradation.

ITU-T Recommendation G.1081 defines performance monitoring points for IPTV which will allow the service provider/network operator to monitor the performance of the complete IPTV service delivery to the end user. The management platform entities manage domains and collect parameters from monitoring points, perform performance analysis, and generate reports. Through network-wide deployment of monitors (performance monitoring points), it is possible to localize the problems to a network segment (or a network domain), but undoubtedly this would be very expensive to achieve high granularity of monitoring. Moreover, service diagnosis requires more than just collecting metrics like packet loss ratio and delay.

In consequence monitoring, diagnosis and fault reporting in services providing multimedia contents over IP network is not properly addressed.

SUMMARY

It is the object of the present invention to obviate at least some of the above disadvantages and provide an improved service problem reporting and diagnosis for use in a communications network.

Accordingly, the invention seeks to preferably mitigate, alleviate or eliminate one or more of the disadvantages mentioned above singly or in any combination.

According to a first aspect of the present invention there is provided a method of reporting a failure of a service providing multimedia content in a communications network. The method comprises collecting connectivity configuration information at user equipment. The user equipment also monitors in real time service connectivity sequences by recording information obtained from headers of packets sent by the user equipment. The method also comprises refining the recorded service connectivity sequences by removing from the recorded service connectivity sequences information related to non-critical connectivity. The step of refining is aimed at discarding irrelevant or sporadic connectivity. Further, the method comprises collecting by a service sequence daemon service connectivity sequences from a plurality of user equipment. In the next step the refined service connectivity sequences are sent to the user equipment. When the user equipment experience a broken service the method comprises reporting by the user equipment the broken service sequence by providing information based on the last correct connectivity in the broken service sequence.

According to a second aspect of the present invention there is provided a method of service performance diagnosis based on reported failure information from a plurality of user equipment operating in a communications network. The method comprises grouping the reported failure information, mapping IDs of the user equipment that reported failures onto a topology of the network and filtering out sporadic failure reports to identify an element of the network that caused the access failure. Finally, when the element which caused the failure is identified the method comprises raising an alarm by sending a message to an Operations Support System, OSS, and/or displaying said alarm on administrative interfaces.

According to a third aspect of the present invention there is provided a network element comprising a processing unit, an interface for transmitting and receiving information to and from a plurality of user equipment. The interface is adapted to receive from a plurality of user equipment information related to service connectivity sequences recorded in real time by the user equipment. The processing unit is adapted to collect refined service connectivity sequences from a plurality of user equipment and to send to the plurality of user equipment the refined service connectivity sequences. The processing unit is further adapted to receive from a user equipment a report about a broken service sequence based on the last correct connectivity in the broken service sequence.

According to a fourth aspect of the present invention there is provided a user equipment for use in a communications network, the user equipment comprising a client for receiving multimedia services and a service sequence monitor. The service sequence monitor is adapted to collect connectivity configuration information associated with multimedia services accessed by the user equipment and to monitor in real time service connectivity sequences by recording information obtained from headers of packets sent by the user equipment. The service sequence monitor is also adapted to send the recorded information related to service connectivity sequence to a network element operating in said network.

Further features of the present invention are as claimed in the dependent claims.

The present invention provides the benefit of reduced costs of operation of a telecommunications network (reduced OPEX), because the proposed methods are fully automated and require no human interaction. The present invention is also easy to implement and run as it is end-to-end based, implemented at user equipment and a server running a service sequence daemon, and requires no modifications to intermediate nodes inside the network. Additionally, when running, the invention requires no prior knowledge about service.

Low reporting overhead is another advantage of the present invention. In the present solution reports are sent only when there are problems and therefore, the traffic overhead is reasonably low.

Accuracy of root cause analysis is greatly improved thanks to sequence refinement methods used in this invention.

BRIEF DESCRIPTION OF THE DRAWINGS

The present invention will be understood and appreciated more fully from the following detailed description taken in conjunction with the drawings in which.

DETAILED DESCRIPTION

Figure 1:
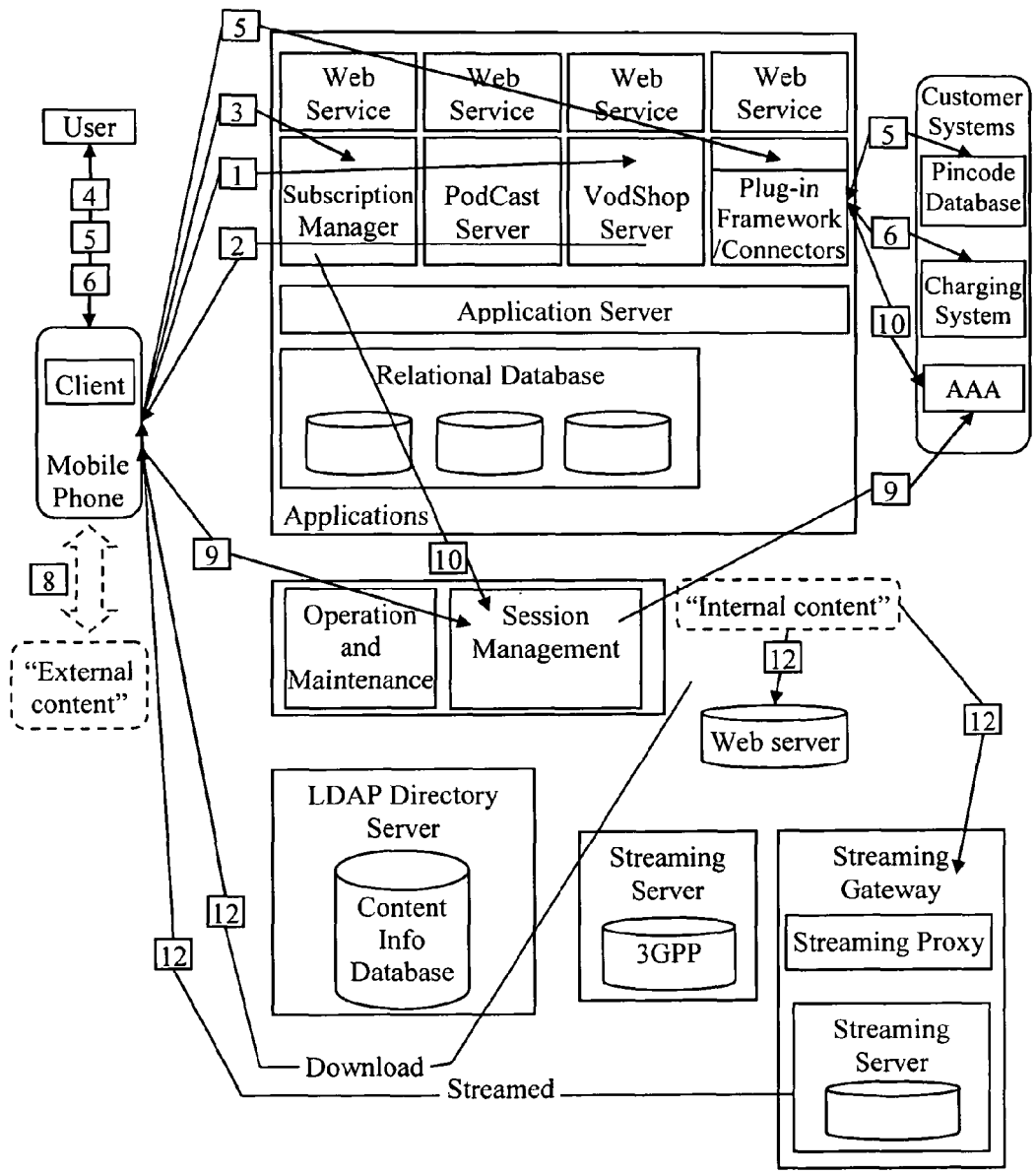
FIG. 1 is a diagram illustrating user steps in a video-on-demand shop TV service.

In a simple embodiment of the present invention user equipment (UE) uses traces of service primitives of one or multiple service sessions. The traces are used to automatically discover service connectivity sequence. With the service connectivity sequence known the UE refines the service connectivity sequences by analyzing connectivities captured during multiple sessions of the same service type and discarding connectivity that does not match the temporal order of majority of the recorded service connectivity sequences of the same service type. In a communications network a plurality of user equipment send the observed and recorded service connectivity sequences of the same service to a service sequence daemon, which then aggregates the service connectivity sequences from different user equipment and filters out irrelevant (noisy) connectivity. The service sequence daemon sends back the refined service connectivity sequence to UE and each UE uses such service connectivity sequence to detect service breakpoints. In case of a service failure the UE sends a problem report to the service sequence daemon and/or to a service monitor.

The term service monitor refers to a service assurance solution or product that monitors quality and end user experiences of the service. The levels of the monitoring include basic monitoring level (service KPIs, Key Performance Indexes, and management of access), built-in set-top-box monitoring, service level management, and broad service monitoring with non-intrusive probes.

A service sequence daemon is software process operating in a server in the communications network that collects the recorded service connectivity sequences from user equipment. In some embodiments of the present invention it refines the service connectivity sequences of the same type and performs service problem diagnosis based on the refined service connectivity sequences.

With a large number of user equipment operating in the network and reporting a failure the service sequence daemon or service monitor aggregates the problem reports received from various UE and discovers the causes of the failure or service degradations.

In order to implement the present invention in its various embodiments it is necessary to overcome some technical challenges of service sequence discovery through capturing connectivity. The most important challenges are discussed below.

(i) Automation. The service sequence is implementation specific. The discovery process must be automated, in order to reduce OPEX and management complexity. The method in accordance with embodiments of this invention is fully automated in sequence discovery and refinement, and requires no human intervention.

(ii) Noise traffic. In the captured service connectivity sequence, some background traffic, such as scheduled email checking, may also be recorded. Such connectivity is irrelevant to the monitored service and needs to be filtered out.

(iii) Repeated service operations. Some captured connectivity, although relevant to the service, may be redundant. For example, end user may repeat some service operations (e.g. PLAY-PAUSE-PLAY-PAUSE). Such repetitions should be filtered out and only essential connectivity is kept.

(iv) Missing connectivity. Some service-related connectivity may not appear in each service sequence. For example, DNS lookup will not be initiated if previous query results are cached locally. So the shortest sequence may lose such connectivity. In some system designs (such as high availability solutions and load balancing), connectivity that performs the same activities may be different, i.e. the server IP addresses may change over time. Therefore, connectivity with two different server IP addresses may have the same functions and needs to be merged.

The present invention in its various embodiments treats a service session as the execution of a series of service activities. Since a service may have multiple implementations, the detailed activities depend on implementations and configurations. However, for a specific implementation of a service, the sequence of the activities should be the same; that is, no matter which client has access to this service, it has to follow the same rules or protocols. Therefore, a set of activities (or steps, such as authentication and DNS lookup) that occur in temporal order during a service session is called an activity sequence for that service (or service implementation). Accordingly, a service activity model consists of a number of activity patterns of the service as illustrated in FIG. 1. For example, the user steps shown in the Video-On-Demand shop TV Service illustrated in FIG. 1 form a service sequence.

A service sequence describes the detailed rules (or logics) behind the specific service implementation. A failed service session means a broken service sequence. The breakpoint of the sequence indicates the causes of the service failure.

A service sequence depends on methods of service implementations and configurations. Discovering the service sequence commonly relies on the knowledge from application designers and owners. These specifications can be written into reports and other deliverables. While straightforward, this requires significant human effort to keep up with the evolution of the service and its deployment environment, especially for the purpose of service problem diagnosis and root cause analysis. This increases OPEX costs. Therefore, it is desirable to investigate automatic service sequence methodologies.

A service connectivity sequence refers to a sequence of connectivity through elements of the network through which a service client communicates with different servers in a service session. A service connectivity may perform one or multiple service activities. Service connectivity sequence is closely correlated with service sequence. Broken service connectivity sequence indicates broken service sequence. Therefore, monitoring service connectivity sequence can be used to represent service sequences, like in a black-box testing approach where internal structure of the system (or a service in this case) is irrelevant.

The present invention assumes that the service sequence is discovered automatically. The reasons for not using a pre-defined service sequence are:
  (i) the mapping between the service sequence and the service connectivity (activities) is not clearly defined;
  (ii) in real-world scenarios, the service sequence depends on the detailed configurations, especially when multi-vendor platforms are used; therefore, the actual service sequence may differ from the pre-defined service sequence;
  (iii) the pre-defined service sequence may not cover all of the sequence activities (such as DNS lookup), implementation-specific activities may be ignored for the purpose of simplicity and detailed service commands (such as RTSP PLAY) may not be mentioned.

In order to discover a service sequence based on monitoring service connectivity, it would be advantageous to have the knowledge of service behaviour model, in order to determine the approximate status of a service session.

A service behaviour model represents high-level service-specific access activities. For example, service behaviour model of mobile TV services describes:
  (i) The basic TV viewing behaviour, for example, user tunes in TV, selects TV channels and further TV programs, sends viewing requests and begins to receive program content.
  (ii) The behaviour specific to mobile TV solutions, for example, receiving RTP packets indicates successful requests of TV content and sending RTSP PLAY indicates the selection of TV programs.

Figure 3:
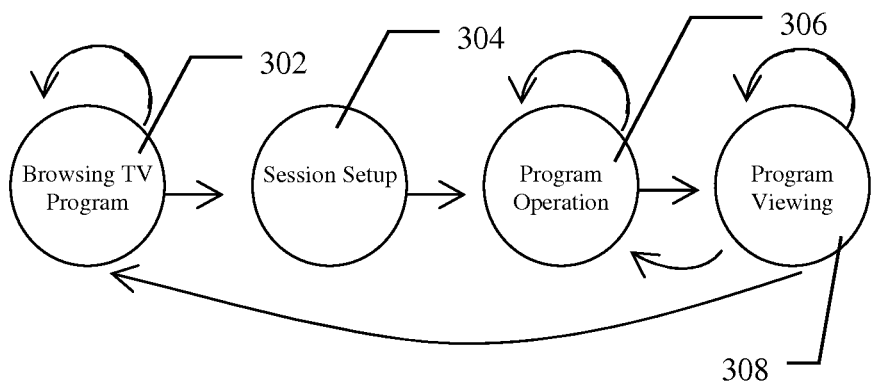
FIG. 3 illustrates a service behaviour model used in embodiments of the present invention.

FIG. 3 illustrates a service behaviour model of fixed/mobile IP TV service. In this model, a user interacts with content servers and goes through the TV program list, 302; after selecting the channels (or programs), the viewer sends session setup request, 304, and may carry out some operations such as PLAY, PAUSE, REWIND, FAST FORWARD, 306; finally, the viewer starts watching the TV program he has selected, 308; the viewer may go back to the TV program list to re-select the channels (the arrow from operation 308 to operation 302), or carry out further operations such as PLAY, PAUSE, REWIND, FAST FORWARD 306.

A traditional method of service behaviour modelling is based on observing the behaviour of individual nodes and aggregating this to observe the behaviour of the service as a whole. Dynamic Bayesian Network (BN) is the common way of achieving this. Here only the basic mechanism of BN is described as the process is well known in the art and is not subject matter of the present invention. The detailed method is implementation specific and has been presented in many existing solutions.

Bayesian Network is a popular technology for monitoring different types of behaviour by specifying the dependencies that hold between aspects of a system. A BN consists of a Directed Acyclic Graph (DAG) structure, where the nodes represent variables from an application domain and the arcs represent the influential relationships between them. Additionally, there is an associated conditional probability distribution over these variables which encode the probability that the variables assume their different values given the values of their parent variables in the BN. The probability distribution can be assigned by an expert, learnt off-line from historical data, or learnt on-line incrementally from a live feed of data.

When applied to embodiments of the present invention the service behaviour model determines when the service sequence monitor starts and finishes capturing connectivity traces. The relationship between service behaviour model, service activity model (including service sequence), and service connectivity sequence is shown in FIG. 4.

Figure 4:
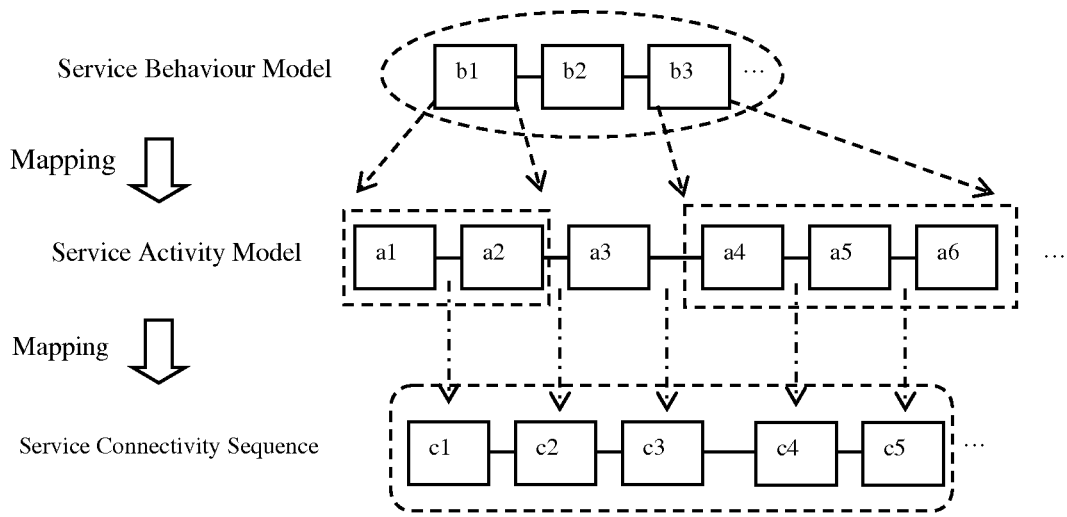
FIG. 4 illustrates relationship between a service behaviour model, a service activity model and a service connectivity sequence.

From FIG. 4 one can see that one high level activity in the service behaviour model, e.g. b1, comprises two activity elements (a1, a2) arranged in a particular order. For example at the behaviour model level an user activity of tuning in IP TV service may consist of authentication and session setup at the service activity model level. In the embodiment illustrated in FIG. 4 step a2, in turn, require a sequence of connectivities arranged in a particular order: c1 and c2. In one embodiment the connectivity c1 will be retrieving the description of a media object identified by the request URL from a server (i.e. RTSP DESCRIBE request and response), and the connectivity c2 will be with the service provider setting up a connection of a required (or available) bandwidth (i.e. RTSP SETUP request and response).

Figure 2:
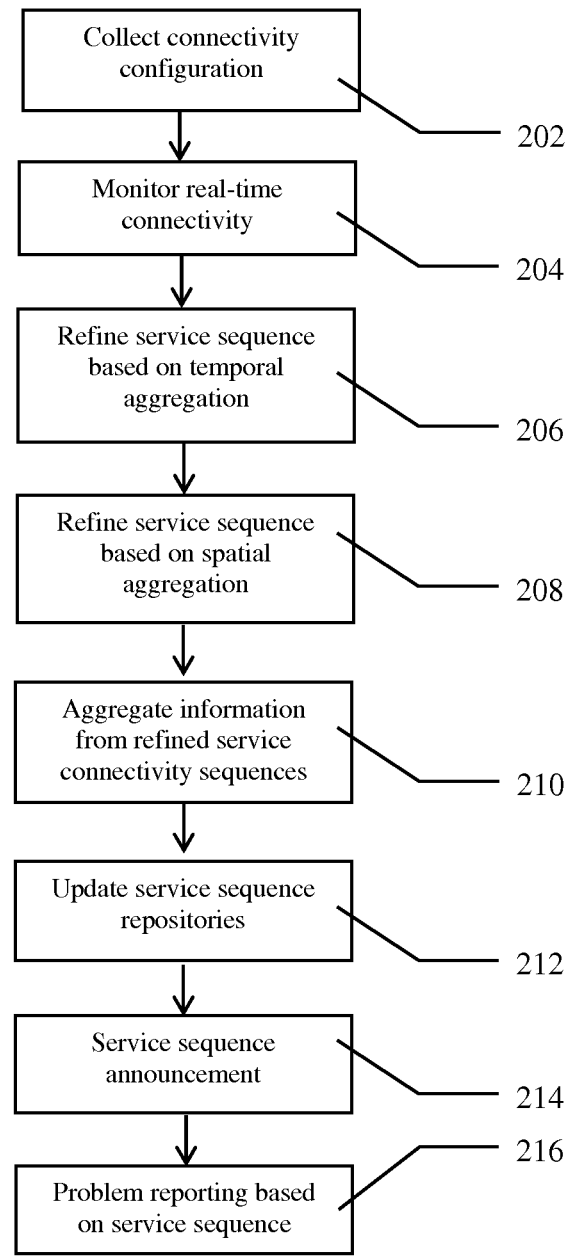
FIG. 2 is a diagram illustrating a method of reporting a failure of a service providing multimedia content in a communications network in one embodiment of the present invention.
Figure 5:
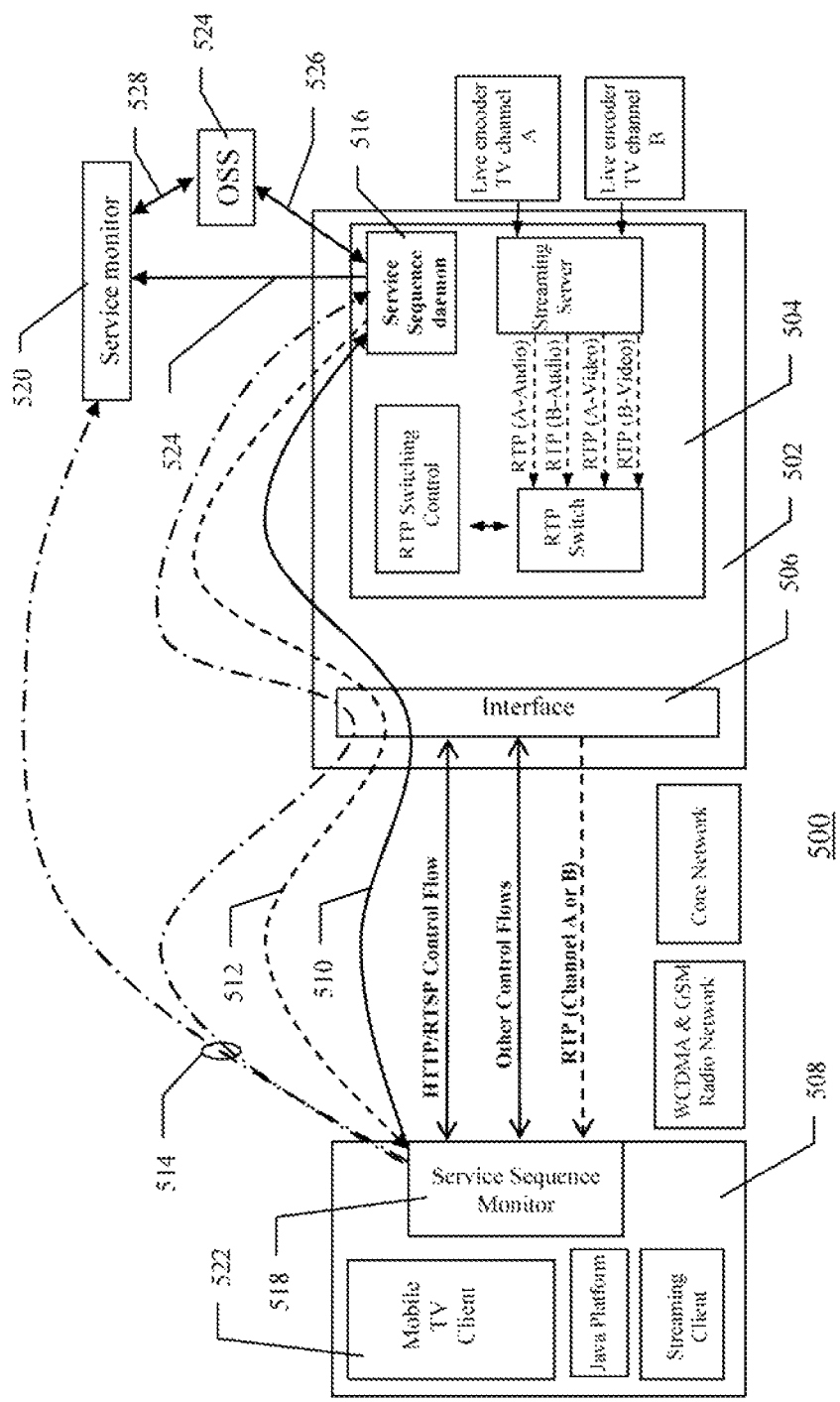
FIG. 5 illustrates user equipment and network element operating according to one embodiment of the present invention.

One embodiment of the present invention is illustrated in FIG. 2. In a preferred embodiment of the present invention a service sequence monitor, 518, shown in FIG. 5, is implemented in user equipment 508 and a service sequence daemon 516 is implemented in a server or network element 502 in a communications network 500. A method of reporting a failure of a service providing multimedia content in a communications network 500 comprises steps of discovering service connectivity sequence by collecting, 202, connectivity configuration information and monitoring, 204, in real time service connectivity sequences.

The operations of sequence discovery are carried out in a service sequence monitor 518, a module implemented in the user equipment 508 (e.g. mobile phone, netbook, laptop, etc.), and in one embodiment the service sequence monitor 518 collects pre-defined connectivity configuration information, including IP addresses of servers (such as content servers and authentication servers) and source/destination port number (this is important for services running on non-official ports). This information can be extracted from captured SDP messages (Session Description Protocol) or from other configuration files.

In the embodiment using the SDP messages, a SDP message contains the following fields:
Media Descriptions ("m=")
  m=<media> <port> <proto> <fmt>
  In its sub-fields, <media> is the media type ("audio", "video", "text", "application", and "message")<port> is the transport port to which the media stream is sent. The meaning of the transport port depends on the network being used as specified in the relevant "c=" field, and on the transport protocol defined in the <proto> sub-field of the media field.
Connection Data ("c=")
  c=<nettype> <addrtype> <connection-address>

If the session is multicast, the connection address ("<connection-address>") is an IP multicast group address. If the session is not multicast, then the connection address contains the unicast IP address of the expected data source or data relay or data sink as determined by additional attribute fields.

Example: c=1N IP4 224.2.36.42/127

Such information is preferably recorded in a table and used for defining connectivity dumping patterns. Table 1 below is an example of such table.

TABLE 1

| ROLE | PORT NUMBER | IP ADDRESS |
|---|---|---|
| RTP/VIDEO (Data) | 49170/c | 224.2.36.42 |
| RTCP (Control) | 49171/c | — |
| RTSP (Control) | 554/s | ... |
| ... | ... | ... |

The service sequence monitor 518 in the UE monitors, 204, in real time service connectivity sequences by recording information obtained from headers of packets sent by the user equipment 508. In a preferred embodiment the real time monitoring also includes recording information obtained from headers of packets received by the user equipment.

The service sequence monitor 518 dumps headers of the packets sent and received by the UE. In one embodiment it is achieved through porting TCPDUMP/LIBPCAP to mobile software platform or using existing APIs, Application Programming Interfaces, provided by mobile operating systems. TCPDUMP/LIBPCAP is a packet sniffer (or packet analyzer), a function implemented in software that can intercept and log traffic passing through a digital network and be used for low level packet capture. The activities are recorded in temporal order as illustrated in Table 2 below.

TABLE 2

| TIME-STAMP | LOCAL IP | LOCAL PORT | REMOTE IP | REMOTE PORT | DIRECTION |
|---|---|---|---|---|---|
| 10.473000 | 224.2.36.42 | 3937 | 82.211.92.253 | 554 | Send & Recv |
| ... | ... | ... | ... | ... | ... |

Connectivity Dumping Based on Service Behaviour Model

The dumping period is determined by the service behaviour model. Based on the behaviour model of the IP TV service (over fixed or mobile connection) as illustrated in FIG. 4, in order to capture a full connectivity sequence the monitor begins to capture the connectivity information when the end user TV client is started. In order to avoid recording unnecessary information the monitor stops dumping connectivity after first data packets (e.g. RTP for IPTV services) are received. This indicates that content delivery has started. The connectivity sequence recorded during such a period is called a Startup Sequence.

The Startup Sequence is captured each time the TV client is started. In addition to the Startup Sequence in alternative embodiments the monitor captures other connectivity sequences.

For example, the monitor starts dumping connectivity when a outgoing RTSP (Real Time Streaming Protocol) DESCRIBE packet is detected on port 554, as shown in Table 2 (i.e. sent by the UE), which indicates that the user is to retrieve the description of a presentation or media object identified by the request URL from a content server. In alternative embodiments, for HTTP based solutions, the monitor starts dumping connectivity when an initial HTTP Get request is detected. Similarly, the monitor stops dumping connectivity, after the first data packets, e.g. RTP (Real-time Transport Protocol) for IPTV services, are received. These connectivity sequences are called Non-startup Sequences.

Without losing generality, this invention allows for user-defined sequence dumping patterns. That is, the service provider may define its own dumping start and end points.

From the service behaviour model we can see that, the Startup Sequence describes a full connectivity a client requires in a TV session. Other connectivity sequences are subsets of the Startup Sequence. Receiving the first content packet is treated in one embodiment of the present invention as the end point of connectivity dumping, because successful delivery of the first packet indicates that a service session has been established.

If no content packets are observed within a timeout period, the recorded sequence is discarded. The value of the timeout interval may be the same with the timeout interval of the TV client software. In this way only connectivity sequences of successful service sessions are recorded. Sequences of unsuccessful service sessions are discarded as being partial and inaccurate, and potentially leading to recording a false picture of the service sequence connectivity.

Refining of the Recorded Service Connectivity Sequences

The recorded service connectivity sequences are refined by discarding information related to non-critical connectivity. The non-critical connectivity in the context of this invention is for example noise traffic and repeated service operations briefly discussed earlier. In general this term refers to traffic that is irrelevant or not necessary for the monitored service.

In a simplest embodiment the refinement 206 is carried out only at the UE 508 and in this process the service sequence monitor 518 analyses service connectivity sequences recorded during multiple sessions of the same service type and discards non-critical connectivity. Different types of sequences, e.g. startup connectivity sequences and non-startup sequences, are analyzed separately. Service sessions of the same service type refer to, for example, multiple user sessions of the same IPTV service. An IPTV viewer may watch two TV programs, program A and program B, through the same IPTV service and therefore they are classified as service sessions of the same service type. Watching these two programs generates similar connectivity sequence records. In one embodiment connectivity is classified as non-critical if it is present in less than a defined percentage of the multiple service sessions of the same service type. In this way any random fluctuations in accessing the service experienced by an individual UE are eliminated.

Figure 2A:
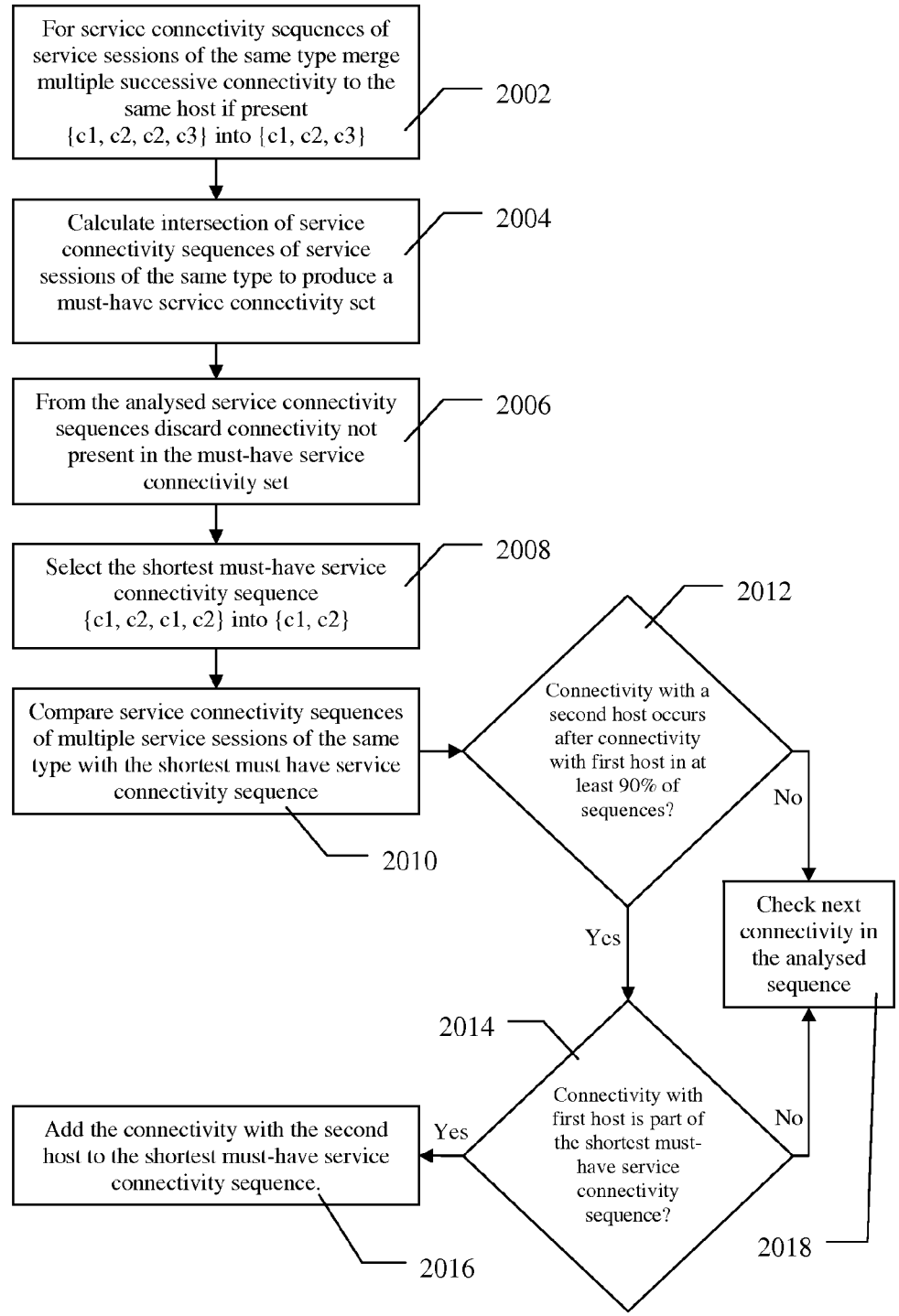
FIG. 2A is a diagram illustrating refinement of recorded service connectivity sequence for use in embodiments of the present invention.

In operation, as illustrated in FIG. 2A, in the process of refinement carried out in the user equipment 508 the service sequence monitor modifies a recorded service connectivity sequence by merging, 2002, multiple successive connectivity to the same host (for example, C={c1, c2, c2, c3}) into (C'={c1, c2, c3}). It is assumed that to connect to one host from the same device the same connectivity set is required. In some situations, however, a recorded service connectivity sequences may contain steps not present in other recorded connectivities. In the next step the service sequence monitor 518 determines a service connectivity sequence sub-set which is a set of service connectivity present in each modified service connectivity sequence of multiple service sessions of the same service type (also referred to as must-have service connectivity set). This is achieved by calculating intersection, 2004, of the sets C'x, i.e. C'1∩C'2. By analysing a plurality of service connectivity sequences to the same host it is possible to identify these elements of the sequence that are present in each of the recorded and analysed sequences. Once the must-have service connectivity set is identified the service sequence monitor, for each modified connectivity sequence, generates a new sequence C'' by discarding, 2006, connectivity that does not appear in the must-have service connectivity set. In the following step the service sequence monitor selects, 2008, the shortest service connectivity sequence from the modified connectivity sequences as a must-have service connectivity sequence. A must-have service connectivity sequence is produced by removing repeated connection patterns to the same host, i.e. {c1, c2, c1, c2}=>{c1, c2}.

It is important to understand the difference between a must-have service connectivity set and a must-have service connectivity sequence. A must-have service connectivity set is a mathematical set concept, in which the elements (e.g. connectivity) are not ordered, whereas a must-have service connectivity sequence a mathematical sequence concept, in which the elements are ordered.

Then, for each recorded service connectivity sequence of multiple service sessions of the same service type, the service sequence monitor, 518, compares, 2010, said service connectivity sequence with the produced shortest must-have service connectivity sequence. If connectivity with a second host occurs after connectivity with a first host in at least a pre-defined number of connectivity sequences, 2012, and if the connectivity with the first host is part of the shortest must-have service connectivity sequence, 2014, then the connectivity with the second host is inserted, 2016, into the shortest must-have service connectivity sequence. Otherwise, the next connectivity in the sequence is checked, 2018.

The refinement carried out by the service sequence monitor, 518, can be described as temporal refinement as it takes into account the sequential flow of connectivity leading to provision of a service by discarding connectivity that does not fit into a statistical pattern recorded for an individual UE.

In an alternative embodiment the refinement, 208, is carried out only by the service sequence daemon 516. In this embodiment the service sequence daemon, 516, collects the recorded service connectivity sequences received from a plurality of user equipment and compares service connectivity sequences of the same type. The refinement, 208, is carried out by removing from the recorded service connectivity sequences information related to non-critical connectivity based on service connectivity sequences from a plurality of user equipment. The service connectivity sequence is sent by the service sequence monitor, 518, to the service sequence daemon, 516, for refinement based on spatial aggregation. The refinement based on spatial aggregation is based on the following rules:

(i) each UE client software of the same service should follow the same protocol and have similar connectivity sequence (pattern);

(ii) it is unlikely that two independent clients experience the same background (noise) traffic during the service sessions.

In one embodiment the non-critical connectivity is defined at the service sequence daemon as a connectivity that is present in less than a defined percentage of the service connectivity sequences of the same service type reported by a plurality of user equipment.

Therefore, the service sequence daemon, 516, compares the connectivity sequences from a plurality of UE. If connectivity c1 from one sequence does not appear in all (or, for example, 90%) of the other sequences, it is safe to remove such connectivity from the sequence as being non-critical.

This type of refinement can be described as a spatial refinement as it takes into account data (service connectivity sequences) recorded by a plurality of user equipment located in different parts of the network and discards data that does not fit into statistical pattern for the plurality of user equipment accessing service of the same type.

In a preferred embodiment refining of the recorded service connectivity sequences is carried out in two phases—temporal and spatial. Preferably the temporal refinement is carried out at the user equipment, 508, as described earlier and the resulting, refined service connectivity sequences are sent from the user equipment, 508, to the service sequence daemon, 516. The service sequence daemon, 516, receives such refined sequences from a plurality of UE and then further refines the received sequences. The refinement performed by the service sequence daemon is the spatial refinement as discussed earlier.

In an alternative embodiment both temporal and spatial refinement processes are performed by the service sequence daemon, 516. In this embodiment the UE sends unrefined service connectivity sequences and the daemon, 516, carries out the temporal refinement of data received from individual UE in isolation from refinement of data received from any other UE. The operation of spatial refinement in this embodiment is not affected.

In yet another embodiment the daemon 516 carries out only the temporal refinement, 206, of unrefined service connectivity sequences received from a plurality of user equipment.

Once the service connectivity sequences are freed from irrelevant information in the refinement process the refined service connectivity sequences of the same type received from a plurality of user equipment are preferably aggregated 210 by the service sequence daemon 516. The step of aggregation, 210, allows for capturing in one service sequence more than one service connectivity sequence that can be used to obtain the same service. For example, if a connectivity c1 of the sequence S1 has different server IP address compared with the corresponding connectivity c1' of the sequence S2, and both are for the same service, then both IP addresses are recorded (aggregated) in the final service sequence (i.e. two servers providing the same functions). After the aggregation the service sequence daemon sends (or announces), 214, to the user equipment the aggregated service connectivity sequences.

In an alternative embodiment the service sequence daemon 516 does not perform aggregation and simply sends, 214, the collected and refined service connectivity sequences to the plurality of user equipment. The service sequence daemon, 516, collects the service connectivity sequences from the plurality of UE. The number of the service connectivity sequences sent to the many UE is large because by not aggregating the received service connectivity sequences the population of the service connectivity sequences is not reduced. However, as a result of removing of the irrelevant connectivity in the refinement process there will be a relatively large number of identical service connectivity sequences. This means it is not necessary to send to the plurality of UE all of these refined service connectivity sequences, but only those that are different, leaving out identical refined service connectivity sequences. In this embodiment the daemon 516 has several different sequences that in a preferred embodiment would be aggregated as discussed earlier, but instead of being aggregated they are sent separately. The UE 508 uses them in same way as it would use the aggregated ones, but instead of checking one aggregated service connectivity sequence the UE must check two or more service connectivity sequences.

In a preferred embodiment a service sequence repository is updated 212 with the results of said aggregation. The sequence repository is a database stored in a memory unit. The memory unit may be located in the network element 502 where the daemon 516 operates, but in alternative embodiments it may be located elsewhere in the communications network 500.

In the next step the aggregated service connectivity sequence is sent 214 to the plurality of user equipment. This provides the UE 508 with a description of a sequence leading to provision of a specific service. Based on that the UE 508 can identify which of the steps of the service connectivity sequence have been successful and if there is a problem with getting the requested service it is possible to identify which connectivity in the sequence was the last correct connectivity and this allows to localize where the failure occurred. In case of a failure, e.g. the service stops in the middle of the sequence, and the next connectivity in the sequence does not appear, the user equipment reports 216 a broken service sequence by providing information based on the last correct connectivity in the broken service sequence. For example, a client sends a RSTP PLAY request (observed by the sequence monitor); it expects the arrival of the RTP packet, as recorded in the connectivity sequence. However, if nothing is received, the service sequence is violated and the service sequence monitor 518 reports 514 this breakpoint.

After receiving several reports pointing to the same server, the daemon 516 sends, 528, alarms to OSS 526 or to a service management system to acknowledge this.

Preferably the user equipment 508 reports, 514, the broken service sequence to the service monitor 520 of the communications network 500. Also preferably the method comprises a step of sending 524 from the service sequence daemon 516 to the service monitor 520 of the communications network 500 service connectivity sequences from the updated service sequence repositories. The service monitor 520 may display and/or send alarms to the service provider, and/or directly to network management systems. The follow-on procedures depend on the design of the service monitor 520. The role and location of the service monitor 520 is independent of this invention. The service monitor 520 is a service-level way of reporting a broken sequence to service provider to help diagnosis. The service monitor is generally capable of integration with Network Management System/Operations Support System, so it is possible to correlate the reported broken sequence with other data sources, such as events and topology, in order to help discover root cause of service problems.

Figure 6:
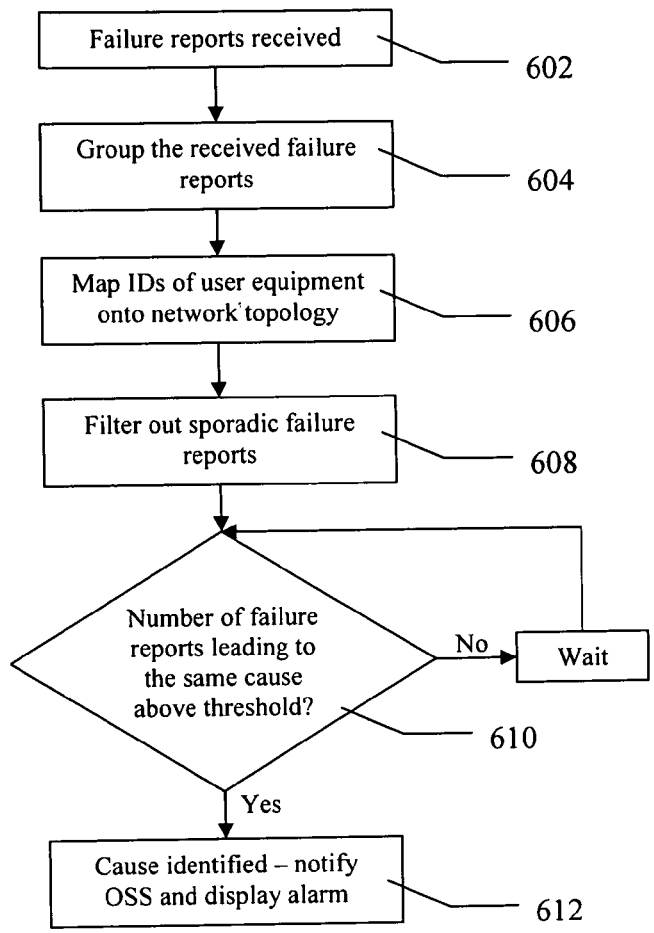
FIG. 6 is a diagram illustrating a method of service performance diagnosis in a communications network in one embodiment of the present invention.

With reference to FIG. 6 a method of service performance diagnosis in one embodiment of the present invention is illustrated. The method is based on failure information received 602 in reports from a plurality of user equipment operating in the communications network. The method assumes that if in a network in which a plurality of UE accesses the same service a failure occurred the analysis of the reports will help diagnosing the root cause of the problem—i.e. identify an element of the network that caused the failure.

When a UE 508 receives from the service sequence daemon 516 the refined or refined and aggregated service connectivity sequences it is able to identify in case of a failure the last element of the network 500 that it had connectivity with. The UE 508 monitors in real time service connectivity sequence by recording information obtained from headers of packets sent by the UE 508 and preferably also received by the UE. In this way the UE knows which element of the network was the last one correctly connected with the UE. This knowledge combined with identification of the service connectivity sequence that corresponds to the service the UE was trying to access forms a failure report that is sent to the service sequence daemon 516. In the case of real failure of an element of the network the service sequence daemon 516 receives a large number of failure reports. The service sequence daemon groups 604 the reported failure reports. In order to find the failed element the daemon tries different ways of grouping the reports, for example by a server port number, a failure timestamp, a server IP address, or any combination of these.

In the next step IDs of the user equipment that reported failures are mapped 606 onto a network topology. Then filtering out 608 sporadic failure reports is carried out to identify 612 the element of the network 500 that caused the access failure. In the identification step using information about service connectivity sequences obtained from a service sequence repository is preferably used. For example, if the daemon received thousand failure reports in which the last connectivity was with router X and only fifty reports where the last connectivity was with various other elements of the network then by discarding the information from the fifty reports, as being sporadic failures, the daemon finds out, using service connectivity sequence from the service sequence repository, that the element that is after the router X in the sequence is the one that caused the failure. Finally, an alarm is raised 612 by sending 528 a message to an Operations Support System, OSS, 526 and/or displaying said alarm on administrative interfaces. The OSS 526, in one embodiment, exchanges, 530, this information with the service monitor 520.

To prevent raising random alarms in a preferred embodiment an element of the network is identified 612 as the element that caused the access failure if the number of failure reports leading to said element as a cause of failure is above a predefined threshold 610.

FIG. 5 illustrates in a great simplification a communications network 500 in which a plurality of user equipment connects to the network and uses services providing multimedia content. For the sake of clarity only one user equipment 508 is illustrated. The network 500 comprises also a network element 502 in one embodiment of the present invention. The network element 502 comprises a processing unit 504 and an interface 506 for transmitting and receiving information to and from a plurality of user equipment 508 and/or other network elements. The processing unit 504 is running a service sequence daemon 516 and in the embodiment illustrated in FIG. 5 it also comprises modules responsible for streaming and switching of RTP traffic. However, in alternative embodiments the processing unit 504 running the service sequence daemon 516 can be separated from the platform for processing RTP traffic.

The interface 506 receives 510 from plurality of user equipment 508 information related to service connectivity sequences recorded in real time by the user equipment 508. In one embodiment the information contains service connectivity sequences refined by the user equipment and in alternative embodiment unrefined. The service sequence daemon 516 collects the service connectivity sequences from a plurality of user equipment after they are refined at the user equipment or by the service sequence daemon, or both. The service sequence daemon then sends 512 to the plurality of user equipment 508 the refined service connectivity sequences and in case a failure prevents access to a service the daemon receives 514 from a user equipment a report about a broken service sequence based on the last correct connectivity in the broken service sequence. In one embodiment the same report is also received, 514, by the service monitor 520.

In a preferred embodiment the daemon 516 is adapted to aggregate the information from the refined service connectivity sequences of the same type received from a plurality of user equipment. If the daemon 516 performs the aggregation then the aggregated service connectivity sequences are sent 512 to the user equipment. The operation of aggregation allows for capturing in one sequence more than one service connectivity sequence that can be used to obtain the same service. For example, if a connectivity c1 of the sequence S1 has different server IP address compared with the corresponding connectivity c1' of the sequence S2, and both are for the same service, then both IP addresses are recorded in the final service sequence (i.e. two servers providing the same functions).

FIG. 5 also illustrates a user equipment, 508, (e.g. a mobile phone, laptop, netbook, etc.) in accordance with one embodiment of the present invention. The user equipment 508 communicates over the communications network 500 with a network element 502. For receiving a multimedia content of the service provided by the network 500 via the network element 502 the UE 508 comprises a client 522 for receiving the provided multimedia services (e.g. IPTV). The UE 508 also comprises a service sequence monitor 518, which is adapted to collect connectivity configuration information associated with the multimedia services accessed by the user equipment 508. The connectivity configuration information includes in a preferred embodiment IP addresses of servers (such as content servers and authentication servers) and source/destination port number. As explained earlier this information can be extracted from captured SDP messages or from other configuration files. The service sequence monitor is also adapted to monitor in real time service connectivity sequences by recording information obtained from headers of packets sent by the user equipment. The recorded information related to service connectivity sequence is then sent by the service sequence monitor to the network element 502.

The invention claimed is:

1. A method of reporting a failure of a service providing multimedia content in a communications network comprising:
    collecting connectivity configuration information at a user equipment;
    monitoring in real time service connectivity sequences by recording information obtained from headers of packets sent by the user equipment;
    refining the recorded service connectivity sequences by removing from the recorded service connectivity sequences information related to non-critical connectivity;
    collecting by a service sequence daemon service connectivity sequences from a plurality of user equipment;
    sending to the user equipment the refined service connectivity sequences; and
    reporting by the user equipment a broken service sequence by providing information based on the last correct connectivity in the broken service sequence,
    wherein refining the recorded service connectivity sequences comprises discarding, from each service connectivity sequence of a same service type reported by a plurality of user equipment, a connectivity that is present in less than a defined percentage of the service connectivity sequences of the same service type reported by the plurality of user equipment.

2. The method according to claim 1 comprising aggregating by the service sequence daemon information from the refined service connectivity sequences of the same type received from a plurality of user equipment wherein the step of sending comprises sending to the user equipment the aggregated service connectivity sequence.

3. The method according to claim 1, wherein the step of refining comprises refining at the user equipment the service connectivity sequences recorded during multiple sessions of the same service type.

4. The method according to claim 3 comprising the user equipment discarding from each recorded service connectivity sequence of multiple service sessions of the same service type the connectivity that is present in less than a defined percentage of the multiple service sessions of the same service type.

5. The method according to claim 3 comprising collecting by a service sequence daemon the refined service connectivity sequences received from a plurality of user equipment and comparing service connectivity sequences of the same type to further refine said service connectivity sequences by removing from the recorded service connectivity sequences information related to non-critical connectivity based on service connectivity sequences from a plurality of user equipment.

6. The method according to claim 1, wherein the step of refining comprises collecting by a service sequence daemon the recorded service connectivity sequences received from a plurality of user equipment and comparing service connectivity sequences of the same type to refine said service connectivity sequences by removing from the recorded service connectivity sequences information related to non-critical connectivity based on service connectivity sequences from a plurality of user equipment.

7. The method according to claim 1, wherein the service connectivity sequences are refined or further refined at the service sequence daemon.

8. The method according to claim 1 comprising extracting connectivity configuration information from Session Description Protocol, SDP, messages.

9. The method according to claim 1, wherein the step of monitoring is initiated by starting a client for a service in the user equipment and stopped when first data packet of the service is received by the user equipment.

10. The method according to claim 1, wherein starting and ending points of the monitoring step are defined by the service provider independently from other services.

11. The method according to claim 1, wherein the user equipment reports a broken service sequence to a service monitor of the communications network.

12. A method of reporting a failure of a service providing multimedia content in a communications network comprising:
    collecting connectivity configuration information at a user equipment;
    monitoring in real time service connectivity sequences by recording information obtained from headers of packets sent by the user equipment;
    refining the recorded service connectivity sequences by removing from the recorded service connectivity sequences information related to non-critical connectivity;
    collecting by a service sequence daemon service connectivity sequences from a plurality of user equipment;
    sending to the user equipment the refined service connectivity sequences; and
    reporting by the user equipment a broken service sequence by providing information based on the last correct connectivity in the broken service sequence,
    wherein the step of refining comprises refining at the user equipment the service connectivity sequences recorded during multiple sessions of the same service type, and
    wherein the method further comprises:

modifying each recorded service connectivity sequence by merging multiple successive connectivity to the same host;
determining a service connectivity sequence sub-set which is a must-have service connectivity set present in each modified service connectivity sequence of multiple service sessions of the same service type;
for each modified service connectivity sequence, generating a new sequence by removing connectivity that does not appear in the must-have service connectivity set;
selecting the shortest service connectivity sequence from the connectivity sequences modified as a must-have service connectivity sequence by removing repeated connection patterns to the same host; and
for each recorded service connectivity sequence of multiple service sessions of the same service type, comparing said service connectivity sequence with the produced shortest must-have service connectivity sequence and if a connectivity with a second host occurs after connectivity with a first host in at least a predefined number of connectivity sequences, and if the connectivity with the first host is part of the shortest must-have service connectivity sequence, then the connectivity with the second host is inserted into the shortest must-have service connectivity sequence.

13. A network element comprising a processing unit, an interface for transmitting and receiving information to and from a plurality of user equipment, wherein the interface is adapted to receive from a plurality of user equipment information related to service connectivity sequences recorded in real time by the user equipment, and the processing unit is adapted to run a service sequence daemon that discards, from each service connectivity sequence of a same service type reported by a plurality of user equipment, a connectivity that is present in less than a defined percentage of the service connectivity sequences of the same service type reported by the plurality of user equipment, and is further adapted to send to the plurality of user equipment the refined service connectivity sequences and to receive from a user equipment a report about a broken service sequence based on the last correct connectivity in the broken service sequence.

14. The network element according to claim 13, wherein the information related to service connectivity sequences is received from a plurality of user equipment after refining in said plurality of user equipment by discarding information related to non-critical connectivity.

15. The network element according to claim 13, wherein the processing unit is adapted to refine or further refine said service connectivity sequences by discarding information related to non-critical connectivity based on service connectivity sequences from a plurality of user equipment.

16. The network element according to claim 13, wherein the processing unit is adapted to aggregate the information from the refined service connectivity sequences of the same type received from a plurality of user equipment and wherein in the step of sending the processing unit is adapted to send to the user equipment the aggregated service connectivity sequence.

17. A user equipment for use in a communications network comprising a client for receiving multimedia services and a service sequence monitor adapted to collect connectivity configuration information associated with multimedia services accessed by the user equipment and to monitor in real time service connectivity sequences by recording information obtained from headers of packets sent by the user equipment, the service sequence monitor is also adapted to send the recorded information related to service connectivity sequence to a network element operating in said network,
wherein the service sequence monitor is configured to refine the service connectivity sequences recorded during multiple sessions of the same service type and to discard from each recorded service connectivity sequence of multiple service sessions of the same service type the connectivity that is present in less than a defined percentage of the multiple service sessions of the same service type.

\* \* \* \* \*

UNITED STATES PATENT AND TRADEMARK OFFICE
CERTIFICATE OF CORRECTION

| | | |
|---|---|---|
| PATENT NO. | : 8,873,402 B2 | Page 1 of 1 |
| APPLICATION NO. | : 13/387771 | |
| DATED | : October 28, 2014 | |
| INVENTOR(S) | : Huang | |

It is certified that error appears in the above-identified patent and that said Letters Patent is hereby corrected as shown below:

In the Specification

In Column 7, Lines 3-6, delete "IP multicast group............fields." and insert the same at Line 2, after "is an", as a continuation paragraph.

In Column 7, Line 7, delete "1N" and insert -- IN --, therefor.

Signed and Sealed this
Fourteenth Day of July, 2015

Michelle K. Lee
*Director of the United States Patent and Trademark Office*